US011085791B2

(12) United States Patent
Saxena et al.

(10) Patent No.: US 11,085,791 B2
(45) Date of Patent: Aug. 10, 2021

(54) METHOD, APPARATUS, AND COMPUTER PROGRAM PRODUCT FOR ON-STREET PARKING LOCALIZATION

(71) Applicant: HERE Global B.V., Eindhoven (NL)

(72) Inventors: Shishir Saxena, Mumbai (IN); Nikhil Vinay Sharma, Mumbai (IN); Akash Paradkar, Mumbai (IN)

(73) Assignee: HERE GLOBAL B.V., Eindhoven (NL)

( * ) Notice: Subject to any disclaimer, the term of this patent is extended or adjusted under 35 U.S.C. 154(b) by 29 days.

(21) Appl. No.: 16/404,916

(22) Filed: May 7, 2019

(65) Prior Publication Data
US 2020/0355515 A1   Nov. 12, 2020

(51) Int. Cl.
*G06K 9/46* (2006.01)
*G01C 21/36* (2006.01)
(Continued)

(52) U.S. Cl.
CPC ..... *G01C 21/3685* (2013.01); *G06K 9/00637* (2013.01); *G06K 9/00812* (2013.01); *G06T 7/60* (2013.01); *G06T 2207/30264* (2013.01)

(58) Field of Classification Search
CPC .. G08G 1/0112; G08G 1/0129; G08G 1/0141; G08G 1/143; G08G 1/147; G08G 1/14; G08G 1/0133; G08G 1/141; G08G 1/144; G01C 21/3685; G01S 13/08; G01S 13/931; G01S 15/08; G01S 15/931; G01S 17/08; G01S 2013/9314; G01S 2015/934;
(Continued)

(56) References Cited

U.S. PATENT DOCUMENTS 8,779,941 B2   7/2014 Amir
8,797,187 B2   8/2014 Harber et al.
(Continued)

FOREIGN PATENT DOCUMENTS

CN   106558217 A   4/2017

OTHER PUBLICATIONS

Ionita, A. et al., *Where to Park? Predicting Free Parking Spots in Unmonitored City Areas*, WIMS'18 (Jun. 2018) 12 pages.
(Continued)

*Primary Examiner* — Quan M Hua
(74) *Attorney, Agent, or Firm* — Alston & Bird LLP

(57) ABSTRACT

A method, apparatus, and computer program product are provided for determining a location of on-street parking. The method includes receiving a plurality of individual probe points along a section of a roadway. Each individual probe point is associated with a location where each probe point was captured by one of one or more vehicles on the section of the roadway. The method also includes selecting one or more of the plurality of individual probe points based on a speed of the one or more vehicles associated with each probe point at a time the probe point was captured. The method further includes comparing the location of the selected probe points with a known roadway representation. Based on the comparison, the method also includes determining one or more groupings of a plurality of potential parking spaces along the section of the roadway. A corresponding apparatus and computer program product are provided.

23 Claims, 6 Drawing Sheets

(51) Int. Cl.
*G06K 9/00* (2006.01)
*G06T 7/60* (2017.01)

(58) Field of Classification Search
CPC ........ G01S 2015/935; G01S 2015/937; G06K 9/00812
See application file for complete search history.

(56) References Cited

U.S. PATENT DOCUMENTS

| | | |
|---|---|---|
| 8,847,790 B2 | 9/2014 | Trum |
| 9,355,063 B2 | 5/2016 | Scharmann et al. |
| 9,911,332 B1 | 3/2018 | Dorum |
| 2014/0254879 A1* | 9/2014 | Smith .................... G08G 1/017 382/105 |
| 2016/0239983 A1* | 8/2016 | Dorum ............... G06K 9/00651 |
| 2016/0321926 A1 | 11/2016 | Mayer et al. |
| 2018/0336784 A1* | 11/2018 | Liu .................. G08G 1/096866 |
| 2018/0364063 A1* | 12/2018 | Dorum ............... G01C 21/3685 |

OTHER PUBLICATIONS

Parking Space Detection With Sensor Data [online] [retrieved Aug. 6, 2019], Retrieved from the Internet: <https://www.reply.com/en/content/parking-space-detection-with-sensor-data>. (undated) 2 pages.

* cited by examiner

METHOD, APPARATUS, AND COMPUTER PROGRAM PRODUCT FOR ON-STREET PARKING LOCALIZATION

TECHNOLOGICAL FIELD

An example embodiment relates generally to parking localization and, more particularly, to determining the location of one or more on-street parking spaces.

BACKGROUND

Digital maps identify the network of roads and increasingly identify a number of other features that are of interest to drivers. For example, digital maps oftentimes identify parking spaces that may be utilized by the drivers. While information regarding parking spaces may be gathered manually or by the analysis of images that have been captured, such information is labor intensive to collect and may be incomplete or outdated. In this regard, the parking spaces that are available may change over time, such as a result of construction or the change in availability of parking due to various events. As such, digital maps that rely upon information regarding parking spaces that was gathered manually or by the analysis of images may not be accurate after the passage of time as the underlying information may become stale and no longer representative of the current parking availability.

Techniques have been developed to extract and detect off-street parking spaces from global positioning system (GPS) probe data, but such techniques do not to extend to the detection of on-street parking spaces from GPS probe data. Traditional algorithms use deterministic and rule-based approaches for discerning off-street parking spaces, which may require constant and regular revision of the algorithms over time as trends in GPS probe data change and newer probe data emerges. Traditional approaches may also perform poorly when probe data becomes large in size for a particular road segment as it may be difficult to differentiate parking spaces from noise. Hence, these approaches do not readily extend to the determination of on-street parking, especially in ever-changing, fast growing, and dynamic cities.

BRIEF SUMMARY

A method, apparatus and computer program product are provided in accordance with an example embodiment in order to facilitate on-street parking localization. In an example embodiment, a method is provided for determining a location of on-street parking. The method includes receiving a plurality of individual probe points along a section of a roadway. Each individual probe point is associated with a location where each probe point was captured by one of one or more vehicles on the section of the roadway. The method also includes selecting one or more of the plurality of individual probe points based on a speed of the one or more vehicles associated with each probe point at a time the probe point was captured. The method further includes comparing the location of the selected probe points with a known roadway representation. The method still further includes determining one or more groupings of a plurality of potential parking spaces along the section of the roadway based on the comparison.

In some embodiments, the method also includes identifying a beginning and an end of each of the one or more groupings based on the determination of the one or more groupings and determining one or more candidate parking spaces along the section of the roadway based on a comparison of the beginning and end of each said grouping with previously known parking information. In some embodiments, the method also includes verifying the accuracy of the one or more candidate parking spaces using imaging technology. In some embodiments, the imaging technology used to verify the accuracy of the one or more candidate parking spaces is based upon at least one of street level images or aerial images.

In some embodiments, the speed of the one or more vehicles associated with each selected probe at the time that each selected probe point was captured is between zero to a predefined maximum speed. In some embodiments, the probe points include information relating to a heading of the vehicle associated with each probe point at the time the probe point was captured. In such an embodiment, the method further includes removing one or more probe points from the selected probe points based on the heading of the vehicle taking each probe point at the time the probe point was captured.

In some embodiments, the method also includes removing probe points from the selected probe points based on the side of the roadway the probe point was captured. In some embodiments, the one or more groupings are determined by a shape algorithm, which selects probe points that form an elongated elliptical shape.

In another example embodiment, an apparatus is provided with at least one processor and at least one non-transitory memory including computer program code instructions, the computer program code instructions configured to, when executed, cause the apparatus to receive a plurality of individual probe points along a section of a roadway. Each individual probe point is associated with a location where each probe point was captured by one of one or more vehicles on the section of the roadway. The computer program code instructions are also configured to, when executed by the at least one processor, cause the apparatus to select one or more of the plurality of individual probe points based on a speed of the one or more vehicles associated with each probe point at a time the probe point was captured. The computer program code instructions are further configured to, when executed by the at least one processor, cause the apparatus to compare the location of the selected probe points with a known roadway representation. The computer program code instructions are still further configured to, when executed by the at least one processor, cause the apparatus to determine one or more groupings of a plurality of potential parking spaces along the section of the roadway based on the comparison.

In some embodiments, the computer program code instructions are also configured to, when executed by the at least one processor, cause the apparatus to identify a beginning and an end of each of the one or more groupings based on the determination of the one or more groupings and determine one or more candidate parking spaces along the section of the roadway based on a comparison of the beginning and end of each said grouping with previously known parking information.

In some embodiments, the computer program code instructions are further configured to, when executed, cause the apparatus to verify the accuracy of the one or more candidate parking spaces using imaging technology. In some embodiments, the imaging technology used to verify the accuracy of the one or more candidate parking spaces is at least one of street level images or aerial images. In some embodiments, the speed of the one or more vehicles associated with each selected probe at the time that each selected probe point was captured is from zero to 20 kilometers per hour.

In some embodiments, the probe points include information relating to an angle of the each vehicle associated with each probe point at the time the probe point was captured. In such embodiments, the computer program code instructions are further configured to, when executed, cause the apparatus to remove one or more probe points from the selected probe points based on the angle of the vehicle taking each probe point at the time the probe point was captured.

In some embodiments, the computer program code instructions are further configured to, when executed, cause the apparatus to remove probe points from the selected probe points based on the side of the roadway the probe point was captured. IN some embodiments, the one or more groupings are determined by a shape algorithm, which selects probe points that form an elongated elliptical shape.

In still another example embodiment, a computer program product is provided with at least one non-transitory computer-readable storage medium having computer-executable program code portions stored therein, the computer-executable program code portions comprising program code instructions configured to receive a plurality of individual probe points along a section of a roadway. Each individual probe point is associated with a location where each probe point was captured by one of one or more vehicles on the section of the roadway. The computer program instructions are also configured to select one or more of the plurality of individual probe points based on a speed of the one or more vehicles associated with each probe point at a time the probe point was captured. The computer program instructions are further configured to compare the location of the selected probe points with a known roadway representation. The computer program instructions are still further configured to determine one or more groupings of a plurality of potential parking spaces along the section of the roadway based on the comparison.

In some embodiments, the computer-executable program code portions further comprise program code instructions configured to identify a beginning and an end of each of the one or more groupings based on the determination of the one or more groupings and determine one or more candidate parking spaces along the section of the roadway based on a comparison of the beginning and end of each said grouping with previously known parking information. In some embodiments, the computer-executable program code portions further comprise program code instructions configured to verify the accuracy of the one or more candidate parking spaces using at least one of street level images or aerial images. In some embodiments, the speed of the one or more vehicles associated with each selected probe at the time that each selected probe point was captured is from zero to 20 kilometers per hour.

In some embodiments, the probe points include information relating to an angle of each vehicle associated with each probe point at the time the probe point was captured. In such embodiments, the computer-executable program code portions further comprise program code instructions configured to remove one or more probe points from the selected probe points based on the angle of the vehicle taking each probe point at the time the probe point was captured. In some embodiments, the computer-executable program code portions further comprise program code instructions configured to remove probe points from the selected probe points based on a side of the roadway the probe point was captured. In some embodiments, the one or more groupings are determined by a shape algorithm, wherein the shape algorithm selects probe points that form an elongated elliptical shape.

In another example embodiment, an apparatus for determining a location of on-street parking is provided. The apparatus includes means for receiving a plurality of individual probe points along a section of a roadway. Each individual probe point is associated with a location where each probe point was captured by one of one or more vehicles on the section of the roadway. The apparatus also includes means for selecting one or more of the plurality of individual probe points based on a speed of the one or more vehicles associated with each probe point at a time the probe point was captured. The apparatus further includes means for comparing the location of the selected probe points with a known roadway representation. The apparatus still further includes means for determining one or more groupings of a plurality of potential parking spaces along the section of the roadway based on the comparison.

In some embodiments, the apparatus also includes means for identifying a beginning and an end of each of the one or more groupings based on the determination of the one or more groupings and determining one or more candidate parking spaces along the section of the roadway based on a comparison of the beginning and end of each said grouping with previously known parking information. In some embodiments, the apparatus also includes means for verifying the accuracy of the one or more candidate parking spaces using imaging technology. In some embodiments, the imaging technology used to verify the accuracy of the one or more candidate parking spaces is based upon at least one of street level images or aerial images.

In some embodiments, the speed of the one or more vehicles associated with each selected probe at the time that each selected probe point was captured is between zero to a predefined maximum speed. In some embodiments, the probe points include information relating to a heading of the vehicle associated with each probe point at the time the probe point was captured. In such an embodiment, the apparatus further includes means for removing one or more probe points from the selected probe points based on the heading of the vehicle taking each probe point at the time the probe point was captured.

In some embodiments, the apparatus also includes means for removing probe points from the selected probe points based on the side of the roadway the probe point was captured. In some embodiments, the one or more groupings are determined by a shape algorithm, which selects probe points that form an elongated elliptical shape.

The above summary is provided merely for purposes of summarizing some example embodiments to provide a basic understanding of some aspects of the invention. Accordingly, it will be appreciated that the above-described embodiments are merely examples and should not be construed to narrow the scope or spirit of the invention in any way. It will be appreciated that the scope of the invention encompasses many potential embodiments in addition to those here summarized, some of which will be further described below.

BRIEF DESCRIPTION OF THE DRAWINGS

Figure 1:
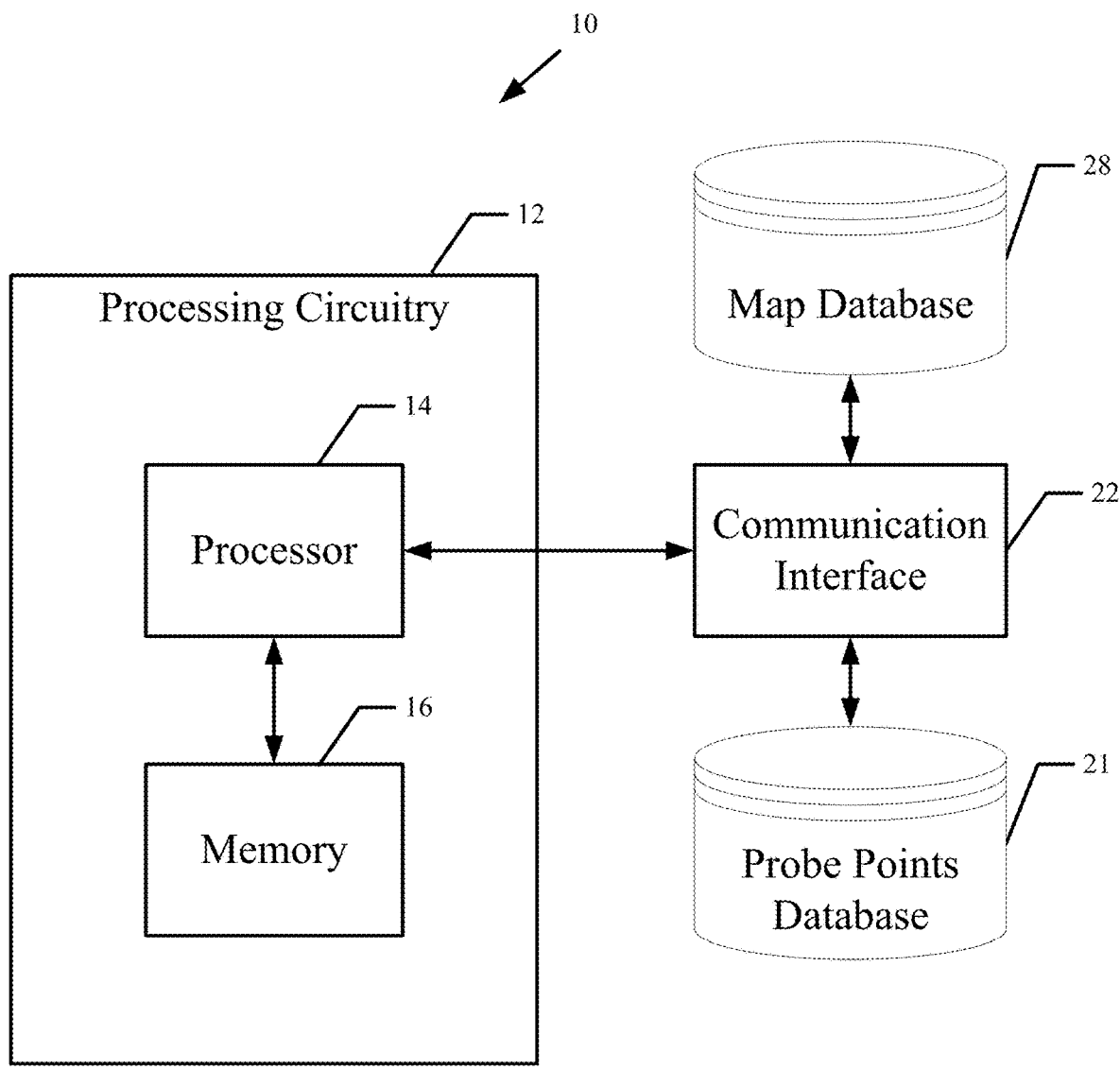
Figure 2:
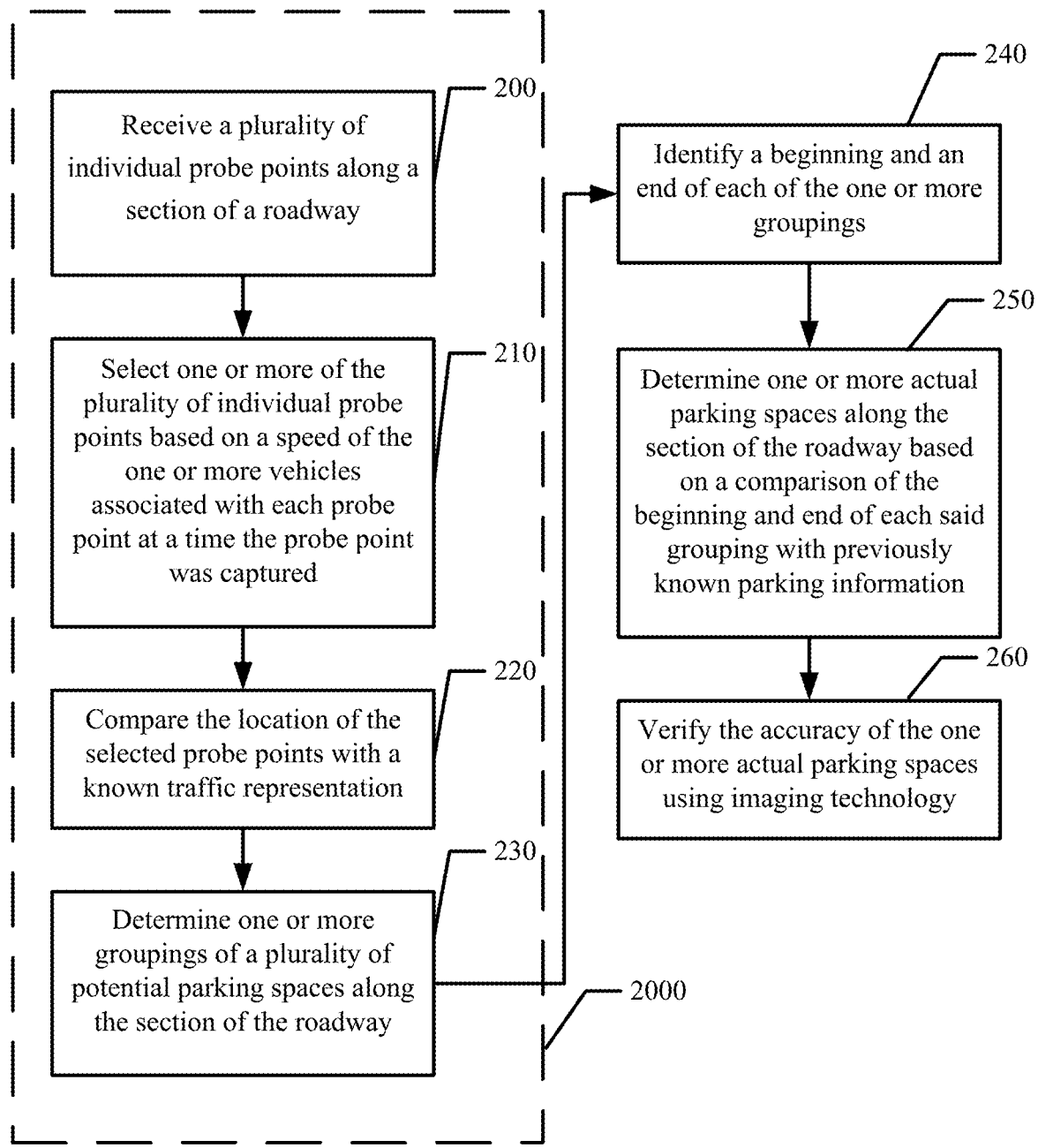
Figure 3:
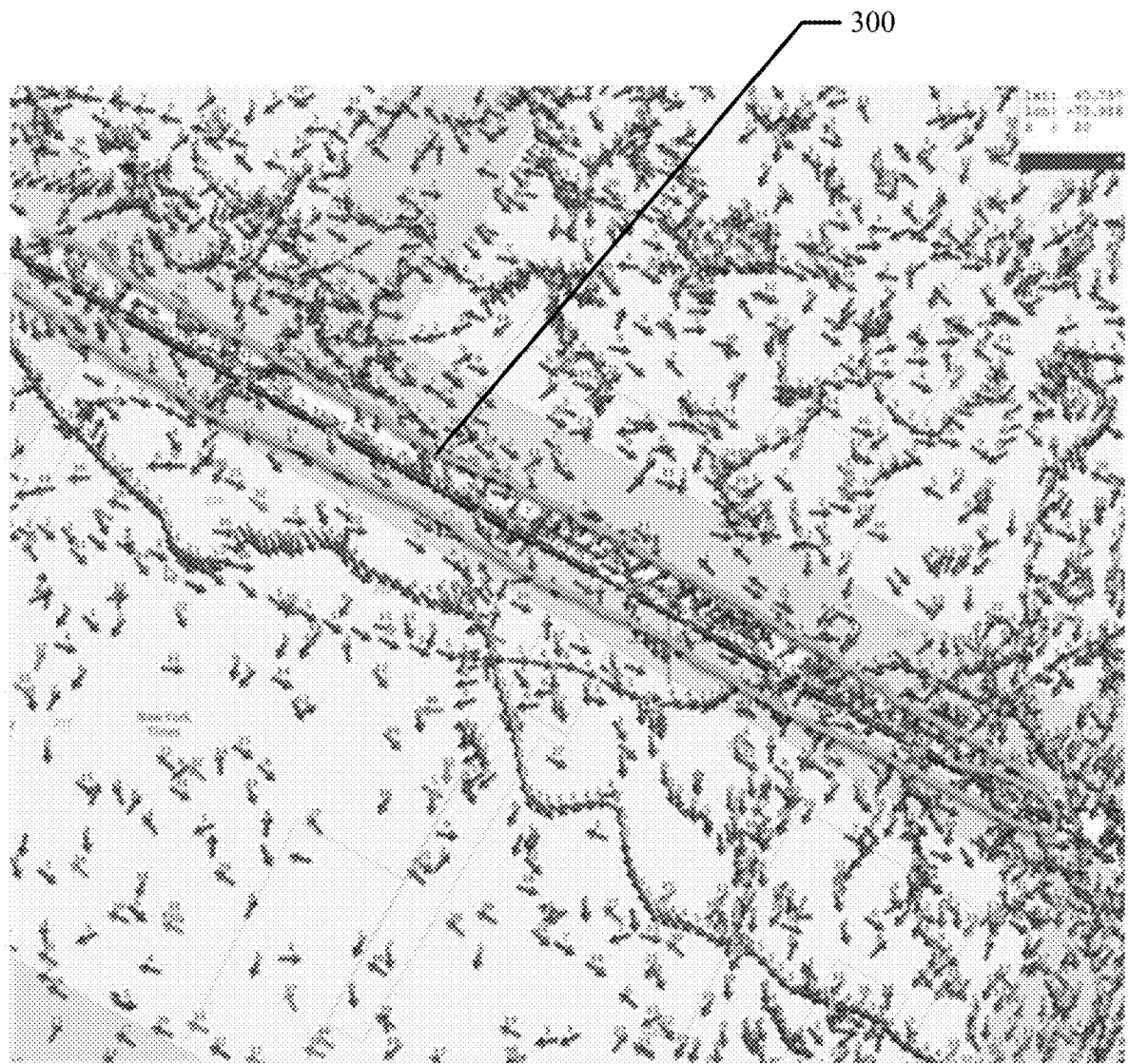
Figure 4:
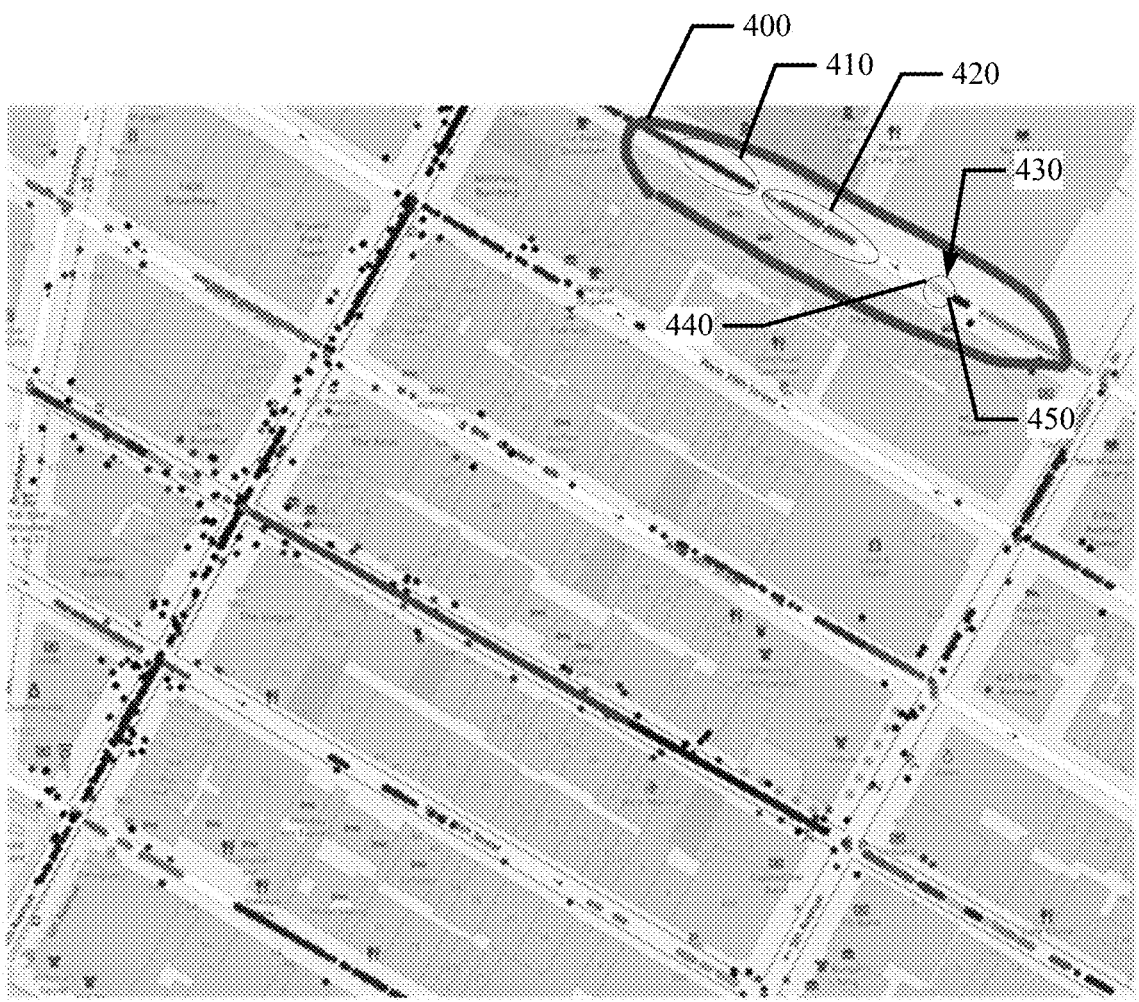
Figure 5:
Figure 6:
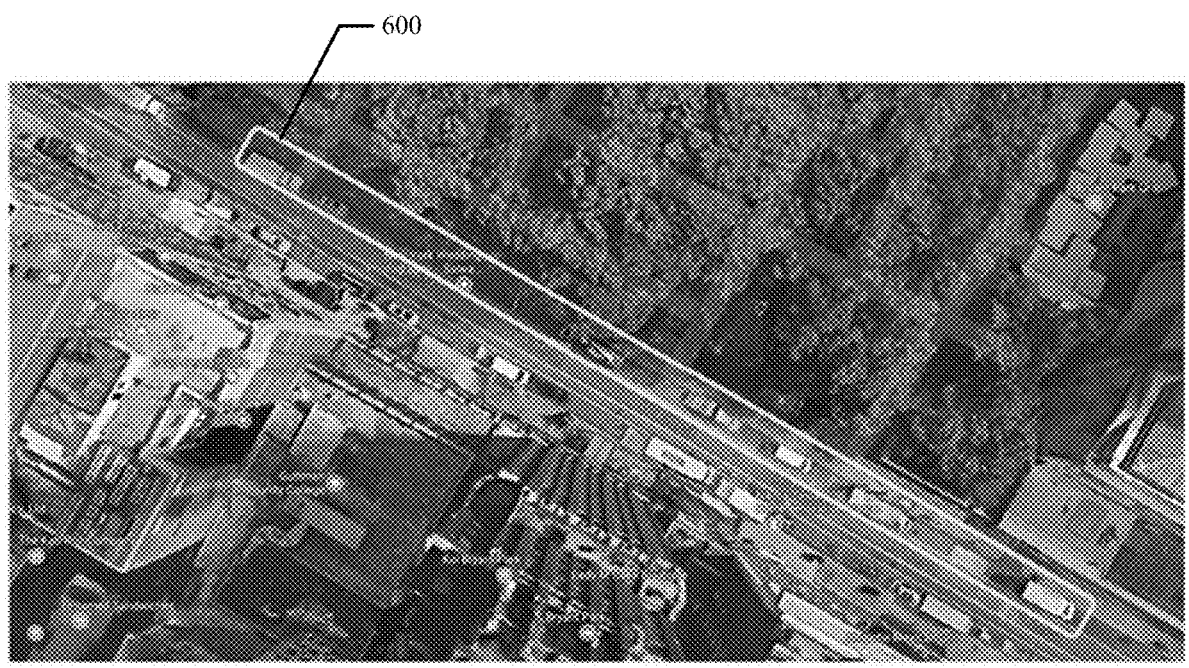

Having thus described certain example embodiments of the present disclosure in general terms, reference will hereinafter be made to the accompanying drawings, which are not necessarily drawn to scale, and wherein:

FIG. 1 is a block diagram of an apparatus that may be specifically configured in accordance with an example embodiment of the present disclosure;

FIG. 2 is a flowchart illustrating the operations of an example embodiment in accordance with the present disclosure;

FIG. 3 is a plurality of probe points along a given area in accordance with an example embodiment of the present disclosure;

FIG. 4 is a map of example potential parking spaces in accordance with the present disclosure;

FIG. 5 is an example street level reference image that may be used for verification in accordance with an example embodiment of the present disclosure; and FIG. 6 is an example aerial reference image that may be used for verification in accordance with an example embodiment of the present disclosure.

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Various embodiments may discuss probe points being captured along a roadway, which may be on or near the roadway unless otherwise noted. Additionally, various descriptions of the probe points referring to speed, direction, location, trajectory, heading or otherwise are intended to refer to the vehicle or to a device, such as a mobile telephone, tablet computer, personal navigation device or the like, carried by the vehicle or a passenger onboard the vehicle at the time the probe points were captured unless otherwise noted. When a vehicle is discussed in relation to a probe point, the vehicle refers to the vehicle carrying the device at the time of capturing the probe point, regardless of whether the device is installed into the vehicle or is carried by a passenger onboard the vehicle at the time the probe point was captured. Thus, use of any such terms should not be captured to limit the spirit and scope of embodiments of the present invention.

While off-street parking is often easily discernible using current techniques, many of the more efficient methods of mapping off-street parking are not viable for identifying and mapping on-street parking. For example, on-street parking is not obvious from looking at map points, as the on-street parking is along the roadway making GPS probe data difficult to differentiate between GPS probe data representative of vehicles on the roadway and GPS probe data representative of vehicles on the side of the roadway (e.g., on-street parking). For example, without any speed information, a vehicle moving along a road and parked on the same road would have almost identical location based information. Additionally, the location information associated with probe points may not be precise enough to determine whether a vehicle was on or near the roadway. However, by considering speed information in accordance with an example embodiment, the method, apparatus and computer program product of an example embodiment are configured to narrow possible parking space groupings to allow for a more reliable determination of the existence of on-street parking.

FIG. 1 is a schematic diagram of an example apparatus configured for performing any of the operations described herein. Apparatus 10 is an example embodiment that may be embodied by or associated with any of a variety of computing devices that include or are otherwise associated with a device configured for determining on-street parking information. Embodiments described herein may be used for map generation, map updating, and map accuracy confirmation. Various embodiments of the apparatus may be embodied or partially embodied as a mobile terminal, such as a personal digital assistant (PDA), mobile telephone, smart phone, personal navigation device, smart watch, tablet computer, camera or any combination of the aforementioned and other types of voice and text communications systems. Alternatively, the apparatus may be embodied by one or more servers, mapping or navigations systems or computer workstations, or by a navigation or mapping system onboard a vehicle. Optionally, the apparatus 10 may be embodied by or associated with a plurality of computing devices that are in communication with or otherwise networked with one another such that the various functions performed by the apparatus may be divided between the plurality of computing devices that operate in collaboration with one another.

The apparatus 10 may include, be associated with, or may otherwise be in communication with a processing circuitry 12, such as a processor 14 and a memory device 16; a communication interface 22; a map database 28, and a probe point database 21. In some embodiments, the processor 14 (and/or co-processors or any other processing circuitry assisting or otherwise associated with the processor) may be in communication with the memory device 16 via a bus for passing information among components of the apparatus. The memory device 16 may be non-transitory and may include, for example, one or more volatile and/or non-volatile memories. In other words, for example, the memory device 16 may be an electronic storage device (for example, a computer readable storage medium) comprising gates configured to store data (for example, bits) that may be retrievable by a machine (for example, a computing device such as the processor 14). The memory device 16 may be configured to store information, data, content, applications, instructions, or the like for enabling the apparatus 10 to carry out various functions in accordance with an example embodiment of the present invention. For example, the memory device 16 could be configured to buffer input data for processing by the processor 14. Additionally or alternatively, the memory device 16 could be configured to store instructions for execution by the processor 14.

The processor 14 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor 14 may include one or more processing cores configured to perform independently. A multi-core processor may enable multiprocessing within a single physical package. Additionally or alternatively, the processor 14 may include one or more processors configured in tandem via the bus to enable independent execution of instructions, pipelining and/or multithreading.

In an example embodiment, the processor 14 may be configured to execute instructions stored in the memory device 16 or otherwise accessible to the processor. Alternatively or additionally, the processor 14 may be configured to execute hard coded functionality. As such, whether configured by hardware or software methods, or by a combination thereof, the processor 14 may represent an entity (for example, physically embodied in circuitry) capable of performing operations according to an embodiment of the present invention while configured accordingly. Thus, for example, when the processor 14 is embodied as an ASIC, FPGA or the like, the processor 14 may be specifically configured hardware for conducting the operations described herein. Alternatively, as another example, when the processor 14 is embodied as an executor of software instructions, the instructions may specifically configure the processor to perform the algorithms and/or operations described herein when the instructions are executed. However, in some cases, the processor 14 may be a processor of a specific device (for example, the computing device) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor. In some embodiments, the processor 14 may be configured to use machine learning or other operations described herein.

The apparatus 10 of an example embodiment may also include a communication interface 22 that may be any means such as a device or circuitry embodied in either hardware or a combination of hardware and software that is configured to receive and/or transmit data from/to other electronic devices in communication with the apparatus, such as by NFC, described above. Additionally or alternatively, the communication interface 22 may be configured to communicate over Global System for Mobile Communications (GSM), such as but not limited to Long Term Evolution (LTE). In this regard, the communication interface 22 may include, for example, an antenna (or multiple antennas) and supporting hardware and/or software for enabling communications with a wireless communication network. Additionally or alternatively, the communication interface 22 may include the circuitry for interacting with the antenna(s) to cause transmission of signals via the antenna(s) or to handle receipt of signals received via the antenna(s). In some environments, the communication interface 22 may alternatively or also support wired communication and/or may alternatively support vehicle to infrastructure wireless links.

The apparatus 10 may be equipped or associated with a probe point database 21. In some embodiments, some or all of the probe point database 21 may be stored in the memory device 16. Additionally or alternatively, some or all of the probe point database 21 may be stored remote from the processing circuitry 12 and may be received by the processing circuitry 12, such as through the communication interface 22. The probe point database 21 may be configured to store probe points collected from one or more vehicles. In some embodiments, the probe points may be collected by any number of sensors, such as a GPS sensors, accelerometers, Light Detection and Ranging (LiDAR) sensors, radar, and/or gyroscope sensors. Any of the sensors may be used to sense information regarding the movement, positioning, or orientation of the device for use in navigation assistance, as described herein according to example embodiments. In some example embodiments, probe points, whether stored in a probe point database 21 or otherwise, may be transmitted to the apparatus 10, such as by near field communication (NFC), Bluetooth™ communication, or the like, or by other forms of wireless or wireline communication. The probe points may include information relating to the state of capture, including one or more of date, time, coordinate location, direction of traffic, speed, angle of vehicle, heading, trajectory, and/or the like. In some embodiments, the probe points may include information related to the source of the probe point (e.g., such as a name and/or reliability indicator). For example, the apparatus 10 may only consider probe points from certain sources (e.g., trusted sources with known margins of error). In some embodiments, the apparatus 10 may be configured to receive probe data directly from a vehicle, such as through the communication interface 22.

The apparatus may be equipped or associated with a map database 28. In some embodiments, some or all of the map database 28 may be stored in the memory device 16. Additionally or alternatively, some or all of the map database 28 may be remote from the processing circuitry 12 and may be received by the processing circuitry 12, such as through the communication interface 22. The map database 28 may include information relating to road mapping, traffic information (real-time and/or historical), known parking lots off-street, known on-street parking, and/or the like.

In an example embodiment, the map database 28 represents road segments in a geographic area. In this regard, the map database 28 contains map data that indicates attributes of the road segments. The map database 28 may include node data, road segment data or link data, point of interest (POI) data, traffic data and/or representation, previously known parking information, and/or the like. The map database 28 may also include cartographic data, routing data, and/or maneuvering data. According to some example embodiments, the road segment data records may be links or segments representing roads, streets, or paths, as may be used in calculating a route or recorded route information for determination of one or more personalized routes. The node data may be end points corresponding to the respective links or segments of road segment data. The road link data and the node data may represent a road network, such as used by vehicles, cars, trucks, buses, motorcycles, and/or other entities. Optionally, the map database 28 may contain path segment and node data records or other data that may represent bicycle lanes, pedestrian paths, sidewalks or other types of pedestrian segments as well as open areas or parks in addition to the vehicle road record data, for example. The road/link segments and nodes can be associated with attributes, such as geographic coordinates, street names, address ranges, speed limits, turn restrictions at intersections, and other navigation related attributes, as well as POIs, such as fueling stations, hotels, restaurants, museums, stadiums, offices, auto repair shops, buildings, stores, parks, etc. The map database can include data about the POIs and their respective locations in the POI records. The map database 28 may include data about places, such as cities, towns, or other communities, and other geographic features such as bodies of water, mountain ranges, etc. Such place or feature data can be part of the POI data or can be associated with POIs or POI data records (such as a data point used for displaying or representing a position of a city). In addition, the map database 28 may include event data (e.g., traffic incidents, construction activities, scheduled events, unscheduled events, etc.) associated with the POI data records or other records of the map database. The map database 28 may also have known parking information relating to on-street parking. For example, the map database 28 may include known on-street parking spaces. The map database 28 may also include information relating to the physical structure of the roadway and surroundings. For example, the map database 28 may include information relating to buildings, sidewalks, trees, or the like.

The map database 28 may be a master map database, such as a high definition (HD) map database, stored in a format that facilitates updates, maintenance, and development. The data in the production and/or delivery formats can be compiled or further compiled to form geographic database products or databases, which can be used in end user navigation devices or systems.

The artificial intelligence (AI) and machine learning employed according to certain example embodiments described herein will now be described. Machine learning is often used to develop a particular pattern recognition algorithm (e.g., an algorithm that represents a particular pattern recognition problem, such as the determination of on-street parking described herein) that is based on statistical inference. In some embodiments, the apparatus 10, such as the processing circuitry 12, the processor 14 or the like, receives large quantities of data (e.g., probe points) from a variety of sources relating to on-street parking and determines whether the on-street parking exists and also whether the on-street parking has already been identified.

For example, a set of clusters may be developed by the apparatus 10, such as the processing circuitry 12, the processor 14 or the like, using unsupervised learning, in which the number and respective sizes of the clusters is based on calculations of similarity of features of the patterns within a previously collected training set of patterns. In another example, a classifier representing a particular categorization problem may be developed by the apparatus 10, such as the processing circuitry 12, the processor 14 or the like, using supervised learning based on using a training set of patterns and their respective known categorizations. Each training pattern is input to the classifier, and the difference between the output categorization generated by the classifier and the known categorization is used to adjust the classifier coefficients to more accurately represent the problem. A classifier that is developed using supervised learning also is known as a trainable classifier.

In some embodiments, the apparatus 10, such as the processing circuitry 12, the processor 14 or the like, is configured to perform content analysis, which includes a source-specific classifier that takes a source-specific representation of the content received from a particular source as an input and produces an output that categorizes that input as being likely to include a relevant data reference or as being unlikely to include a relevant data reference (e.g., likely or unlikely to meet the required criteria). In some embodiments, the source-specific classifier is a trainable classifier that can be optimized as more instances of content for analysis are received from a particular source.

In certain embodiments, the apparatus 10, such as the processing circuitry 12, the processor 14 or the like, is configured to end the analysis upon determining that the received content does not include at least one relevant data reference.

In some embodiments, the apparatus 10, such as the processing circuitry 12, the processor 14 or the like, is configured to determine whether referenced relevant data is already known to the system. In some embodiments, this determination is based on whether data representing the referenced relevant data is stored is a data repository. In certain embodiments, the apparatus 10, such as the processing circuitry 12, the processor 14 or the like, is configured to end the analysis if the system determines that a referenced relevant data already is known.

If the apparatus 10, such as the processing circuitry 12, the processor 14 or the like, determines that previously unknown relevant data is referenced within the content data, the apparatus, such as the processing circuitry, the processor or the like, determines whether the content data quality needs or would benefit from verification. In some embodiments, the determination of whether particular content data quality needs or would benefit from verification is based at least in part on a confidence rating associated with the source that provided the content (e.g., received directly by the apparatus, by a connected or related system, or from a secondary source), as discussed further in reference to FIG. 2 below.

In some embodiments, if the apparatus 10, such as the processing circuitry 12, the processor 14 or the like, determines that the data quality of the received content does need or would benefit from verification (e.g., untrustworthy data from an outside source), the apparatus, such as the processing circuitry, the processor or the like, is configured to submit data representing the referenced relevant data for verification. Verification of a relevant data may be a manual process, an automatic process, or a combination. Verification of data quality may be based at least in part on attributes of the data (e.g., are the results similar to the subset of data collected by the system?), and/or on attributes of the received content (e.g., does the date indicate that this reference is stale?). In some embodiments, the apparatus 10, such as the processing circuitry 12, the processor 14 or the like, is configured to collect references to previously unknown data that were extracted from content received during a predetermined time period, (e.g., a week) and then to submit the set of collected references for verification. Additionally or alternatively, in some embodiments, the apparatus 10, such as the processing circuitry 12, the processor 14 or the like, is configured to submit a relevant data reference for verification directly after identifying the reference within received content.

In some embodiments, if the apparatus 10, such as the processing circuitry 12, the processor 14 or the like, determines that a reference to a previously unknown relevant data is verified, the apparatus, such as the processing circuitry, the processor or the like, is configured to store data representing the referenced relevant data in the data repository, such as the map database 28.

In some embodiments, the apparatus 10, such as the processing circuitry 12, the processor 14 or the like, is configured to associate a confidence rating with each source that has provided content referencing previously unknown relevant data. In certain embodiments, the apparatus 10, such as the processing circuitry 12, the processor 14 or the like, is configured to update the confidence rating associated with the source that provided the reference to the relevant data based in part on the content data quality verification results. For example, in some embodiments, the apparatus 10, such as the processing circuitry 12, the processor 14 or the like, is configured to increase a confidence rating if the relevant data reference is verified and, conversely, to decrease a confidence rating if the relevant data reference is not verified. In another example, the apparatus 10, such as the processing circuitry 12, the processor 14 or the like, is configured to increase a confidence rating if content received from a particular source is determined to include a relatively greater number of verified relevant data references than content received from other sources within a predetermined time period. In some embodiments in which the source is associated with a source-specific classifier, the confidence rating is based in part on a percentage of successful determinations that content includes a relevant data reference. The process ends after the apparatus 10, such as the processing circuitry 12, the processor 14 or the like, updates the confidence rating.

In some embodiments, the AI and models described herein use "deep learning". Deep learning is a subset of machine learning that generates models based on training data sets that have been provided. In some embodiments, the training model may use unsupervised learning techniques including clustering, anomaly detection, Hebbian Learning, as well as techniques for learning latent variable models such as an Expectation-maximization algorithm, a method of moments (mean, covariance), and Blind signal separation techniques, which include principal component analysis, independent component analysis, non-negative matrix factorization, and singular value decomposition.

Referring first to Block 2000 of FIG. 2, the apparatus 10 of an example embodiment includes means, such as the communication interface 20, the processing circuitry 12, the processor 14, or the like, for preprocessing probe point data to determine potential on-street parking spaces. Although the probe point data may be preprocessed in various manners, the apparatus 10, such as the processing circuitry 12, the processor 14 of the like, discussed in FIG. 1 is configured to preprocess the probe point data by performing some or all of the various operations shown in Blocks 200-230 of FIG. 2.

In this embodiment and referring to Block 200 of FIG. 2, the apparatus 10 includes means, such as the communication interface 20, the processing circuitry 12, the processor 14, or the like, for receiving a plurality of individual probe points along a section of a roadway. In some embodiments, each individual probe point is associated with a location where each probe point was obtained by one of one or more vehicles or other probe point sources on the section of the roadway. For example, in some embodiments, the navigation system and/or GPS system of one vehicle may capture one or more probe points at various locations along a section of a roadway. Additionally, a plurality of other vehicles may capture one or more probe points along the same section of roadway. In some embodiments, vehicles capturing probe points may be located along a roadway (e.g., within a certain proximity to the roadway, such as in parking spaces adjacent to the road). In some embodiments, the probe points received by the apparatus 10 may include information relating to the vehicle at the time a probe point was captured, such as one or more of the speed of the vehicle, the longitudinal and latitudinal location of the vehicle, the side of the street, the angle of the vehicle, the direction of the vehicle, the heading of the vehicle, the trajectory of the vehicle and the like.

In some embodiments, the probe points may be received by the processing circuitry 12, such as the processor 14, from the probe point database 21. In some embodiments, the probe points may be received by the processing circuitry 12, such as the processor 14, directly from the vehicle and, more particularly, a probe point source onboard the vehicle that captures the probe point, such as through the communication interface 22 of the apparatus 10. In some embodiments, the processing circuitry 12, such as the processor 14, may be configured to initially filter the probe points that have been received by a characteristic, such as the date, time, location, direction, speed, and/or the like. For example, the apparatus 10 may be configured to only process a set of probe points captured during morning traffic along a roadway and, as such, may filter out probe points from other time periods. In this embodiment, the apparatus 10 includes means, such as the processing circuitry 12, the processor 14, or the like, for initially removing one or more probe points based on a characteristic, such as date, time, location, direction, speed, and/or the like. As another example, the apparatus may receive one or more probe points for a different section of roadway than the roadway of interest and the one or more probe points for the different section of roadway may be removed from the collection of probe points before the operations discussed in Block 210 of FIG. 2.

Referring now to FIG. 3, a plurality of probe points are shown on a map along a section of roadways with each probe point represented by an arrow that originates at the location of a vehicle at the time that the probe point was captured and that extends in a direction that represents the heading of the vehicle at the time that the probe point was captured. FIG. 3 illustrates an example set of probe points, such as one received by the processing circuitry 12, such as the processor 14, before the probe points are filtered or otherwise preprocessed in any way based on location, clustering, speed, direction, and/or the like, as discussed herein. In some embodiments, the apparatus 10, such as the processing circuitry 12, may perform an initial filtering that designates one or more of the probe points as being along a section of roadway, such as the probe points shown in callout 300. Additionally or alternatively, the apparatus 10, such as the processing circuitry, may receive probe points that are already filtered by one factor or another. As shown, the probe points may include points captured on a section of roadway and near a section of roadway. For example, the probe points may include vehicles parked both in on-street parking spaces and off-street parking lots. In some embodiments, the probe points may also include probe points for other nearby roads. In an example embodiment, as discussed in further detail below in reference to Block 220 of FIG. 2, the probe points may be overlaid with map data, such as streets, known parking information, and the like. In some embodiments, the apparatus, such as the processing circuitry, may be configured to identify roadways based on a plurality of vehicles travelling in the same direction.

Referring now to Block 210 of FIG. 2, the apparatus of an example embodiment includes means, such as the processing circuitry 12, the processor 14, or the like, for selecting one or more of the plurality of individual probe points based on a speed of the one or more vehicles associated with each probe point at a time the probe point was captured. In some embodiments, each of the probe points may include speed information of the vehicle at the time the probe point was captured. In some embodiments, the one or more of the plurality of individual probe points selected by the apparatus 10, such as the processing circuitry 12, may have been captured by a vehicle travelling at or near zero kilometers per hour. For example, the apparatus 10, such as the processing circuitry 12, may be configured to select the probe points captured by vehicles, such as probe point sources onboard vehicles, travelling between zero kilometers per hour and a predefined maximum speed, such as twenty kilometers per hour. In an example embodiment, the probe points associated with a given speed (e.g., from zero kilometers per hour to twenty kilometers per hour) may be marked by the processing circuitry as a potential parking space. In some embodiments, the apparatus 10 includes means, such as the processing circuitry 12, e.g., processor 14, for removing one or more probe points from the selected probe points based on the heading of the vehicle capturing each probe point at the time the probe point was captured. For example, the processing circuitry, such as the processor, of an example embodiment may be configured to remove probe points having a heading that varies from the direction of the roadway, from the average heading of the vehicles along the roadway or the like by more than a predefined amount. In some embodiments, the apparatus 10 also or alternatively includes means, such as the processor 14, for removing probe point(s) from the selected probe points based on the side of the roadway the probe point was captured such that the remaining probe points were all captured from vehicles along the same side of the roadway.

Referring now to optional Block 220 of FIG. 2, the apparatus 10 includes means, such as the processing circuitry 12, the processor 14, or the like, for comparing the location of the selected probe points with a known roadway representation. In some embodiments, the apparatus 10 includes means, such as the communication interface 20, the processing circuitry 12, the processor 14, or the like, for receiving a roadway representation that provides information regarding the roadways. In some embodiments, the roadway representation may be received from a map database 28. In some embodiments, as shown in FIG. 3, the probe points received by the apparatus may include probe points both on, nearby, and/or off a given roadway. In some embodiments, the apparatus 10 includes means, such as the processing circuitry 12, the processor 14, or the like, for removing probe points from the selected probe points based on the proximity to a given roadway. For example, the apparatus, such as the processing circuitry, may be configured to remove all probe points more than 10 meters from the center of a roadway (e.g., leaving only the vehicles on the road or close by, such as in on-street parking) as defined by the roadway representation. In some embodiments, the location data associated with a probe point may highly precise. For example, the coordinates of a probe point may be accurate up to 6 decimal point precision. In some embodiments, the probe points may only be received from trusted vendors. In some embodiments, the apparatus 10 such as by the processing circuitry 12, for determining the closest roadway to a given probe point.

In some embodiments, the roadway representation may include information about the number of lanes for a road and allow the apparatus 10, such as the processing circuitry 12, to further filter probe points that are located near, but not on the roadway. For example, for a standard two lane road may be 3.7 meters lane, the apparatus, such as the processing circuitry may remove any selected probe points that are less than 3.7 meters from the center of the roadway to eliminate any probe points captured on the road. In some embodiments, the location information associated with a probe point may have a margin of error (e.g., location data may be within 3 to 5 meters of the actual location) and the apparatus 10, such as the processing circuitry 12, may be configured to compensate for the margin of error by incorporating the margin of error into the distances used to remove probe points (e.g., for a two lane road with 3.7 meters lanes and a location information margin of error of 3 meters, the apparatus 10 may select probe points from 0.7 meters from the center of the roadway to 10 meters to include any potential probe points captured by vehicles on the side of the road). In some embodiments, the apparatus 10 includes means, such as the processing circuitry 12, e.g., processor 14, for determining a confidence level of one or more of the selected probe points being a potential parking space based on the comparison with the roadway representation. In some embodiments, one or more of the selected probe points may be designated as a potential parking space based on the confidence level determined. In some embodiments, the confidence level may be determined using AI and machine learning as discussed above based on the results of previous iterative processing. In some embodiments, the confidence level may be based on probe speed, probe angle, probe direction, probe time, and/or the like. For example, probe points selected by an apparatus 10 according to an example embodiment may have a higher confidence level the closer the speed is to zero kilometers per hour (e.g., parked).

In some embodiments, the roadway representation may include traffic data, such as information relating to delays at a given time. For example, there may be a large number of probe points travelling at a low speed along a given road during rush hour because of an accident, traffic or other reasons. The roadway representation may be received from the map database 28. In some embodiments, the apparatus 10 includes means, such as the processing circuitry 12, e.g., the processor 14, for removing probe points from the selected probe points that may be false indicators of on-street parking (e.g., due to traffic). For example, probe points that may otherwise be determined to be representative of parked vehicles due to the low speed associated with the probe points may be removed from the selected points in those regions for which the traffic is significantly delayed due to excess traffic, construction, etc. since the probe points may actually be indicative of vehicles on the roadway and moving at a very slow speed instead of vehicles that are parked. In some embodiments, the probe points that may be false indicators of on-street parking (e.g., due to traffic) may remain in the selected probe points, but may be assigned a diminished confidence level.

Referring now to Block 230 of FIG. 2, the apparatus 10 includes means, such as the processing circuitry 12, the processor 14, or the like, for determining one or more groupings of a plurality of potential parking spaces along the section of the roadway. In various embodiments, the one or more groupings of probe points may be chosen from the selected probe points. In some embodiments, the groupings may be a plurality of potential parking spaces as represented, e.g., by selected probe points that are in close proximity to one another. In some embodiments, the probe points in a given grouping may have the same heading. For example, all probe points captured by a vehicle travelling between 0 and 20 kilometers per hour going in a given direction that overlap (e.g., are close in proximity to one another, including for margin of error) may be placed in a grouping together. In some embodiments, the groupings may be based on the proximity of a given probe point to another probe point. For example, a probe point may be placed in a grouping if said probe point is less than a predefined distance, such as may be defined as a car length, away from another probe point in the group. As discussed below, in some embodiments the apparatus 10 includes means, such as the processing circuitry 12, e.g., the processor 14, for using one or more algorithms to determine one or more groupings based on clustering and shapes of said clusters. For example, as discussed below, groupings may be a cluster of probe points in proximity with a generally linear shape. In some embodiments, the apparatus, such as the processing circuitry 12, e.g., the processor 14, may employ AI and machine learning, as discussed above, to improve the algorithms based on the determination of parking spaces and the verification process.

As shown in FIG. 4, there may be a plurality of groupings along a section of roadway. In the example shown in FIG. 4, callout 400 shows a section of roadway with a plurality of different groupings (e.g., groupings 410, 420, and 430). The determination of the groupings may be based on the location of the probe points, the heading of the vehicles, and/or the like. For example, a grouping may be a plurality of probe points captured within a predefined proximity to at least one other probe point and/or probe points that were all captured by vehicles pointed in the same direction, e.g., having the same or a similar heading. In some embodiments, the groupings may be determined using a clustering algorithm to group clusters of probe points that meet a specific criteria (e.g., speed from 0 to 20 kilometers per hour).

In some embodiments, the cluster algorithm may be any algorithm configured to group one or more points based on the location of the points. In some embodiments, the clustering algorithm used may be a hierarchical density-based spatial clustering of applications with noise (HDBSCAN). In an example embodiment, the clustering algorithm may be fine-tuned based on parameters, such as cluster size and noise cancellation. For example, an apparatus 10 that uses HDBSCAN may alter the min_cluster_size and/or the min_samples. For example, the minimum cluster size and/or the minimum samples may be increased from a default setting. In an example embodiment, the cluster_size and min_samples parameters of HDBSCAN may take any positive values. In an example embodiment, the min_cluster_size parameter may be increased to remove small noisy clusters. In some embodiments, the min_samples parameter may be increased to make the algorithm more conservative (i.e., more points will be marked as noise (not part of any cluster). In some embodiments, the range of the min_cluster_size parameter may be 100 to 500. In some embodiments, the min_samples parameter may be set from 0 to 500. In some embodiments, the min_samples and min-cluster_size parameters may altered within or outside of the above ranges based on the data being analyzed (e.g., the determination of a grouping in a city may be different than in rural areas).

In some embodiments, one or more shape algorithms may be used to determine the shape of one or more groupings. In some embodiments, clustering algorithm(s) and shape algorithm(s) may be used by the apparatus 10, such as the processing circuitry 12, e.g., the processor 14. In an example embodiment, a convex hull algorithm may be used to determine the shape of one or more groupings. In some embodiments, the parameters of the shape algorithm may be fine-tuned based on the desired shape. In some embodiments, the shape of a grouping may be based on a line drawn around the edges of all of the points in a cluster (e.g., groupings 410, 420, and 430). In some embodiments, the desired shape of a grouping may be an elongated shape, such as an elongated ellipse (e.g., potentially representing on-street parking spaces). In some embodiments, an elongated elliptical shape may generally be a shape that has a greater diameter along one axis than the diameter along other axis.

In some embodiments, the apparatus 10 may include means, such as the processing circuitry 12, e.g., processor 14, for removing groupings from the one or more groupings based on the shape of the grouping. In some embodiments, the groupings that may be potential on-street parking may be long and thin (e.g., representative of parking spaces along a roadway). Additionally, groupings that are shaped differently than typical on-street parking may be removed from further consideration. For example, an off-street parking lot may appear as a grouping and may be removed by the apparatus, such as the processing circuitry 12, based on the shape of the cluster being, for example, a generally round blob as opposed to a generally elongated elliptical shape.

Referring now to Block 240 of FIG. 2, the apparatus 10 includes means, such as the processing circuitry 12, the processor 14, or the like, for identifying a beginning and an end of each of the one or more groupings. In some embodiments, a grouping of probe points may form approximately a linear shape from a beginning (e.g., point 440 of FIG. 4) to an end (e.g., point 450 of FIG. 4). In some embodiments, the beginning and end points may be designated based on the coordinates of each point. In some embodiments, the apparatus 10 may determine, such as by the processing circuitry 12, e.g., the processor 14, the length of a given grouping from the beginning to the end. Based on this length, an estimated number of on-street parking spaces may be determined by the processing circuitry, such as based on estimated space length. In some embodiments, the beginning and end of each of the one or more groupings may be determined by the processor 14 using the cluster algorithm (e.g., HDBSCAN) and/or the shape algorithm (e.g., convex hull) used in the determination of the one or more groupings. For example, the apparatus 10, such as the processor 14, may use the cluster algorithm and the shape algorithm, in combination, to select probe points along a generally linear shape to be included in a group, such that there is a defined beginning and end of the linear shape.

Referring now to Block 250 of FIG. 2, the apparatus 10 includes means, such as the processing circuitry 12, the processor 14, or the like, for determining one or more candidate parking spaces along the section of the roadway based on a comparison of the beginning and end of each grouping with previously known parking information accessible, for example, from the map database 28. In some embodiments, the previously known parking information may have information relating to the presence of one or more parking spaces. In such an example, the apparatus 10, such as the processing circuitry 12, may verify that the previously known parking information matches the groupings. For example, new on-street parking spaces may be introduced since the previously known parking information or the previously known parking information may be incomplete. In some embodiments, the apparatus 10 includes means, such as the processing circuitry 12, the processor 14, or the like, for using parking information to determine the relative reliability of one or more groupings. In some embodiments, the apparatus 10, such as the processing circuitry 12, may determine a confidence level of a grouping based on parking information based on various factors, such as previously known parking spaces, known traffic configurations, known obstructions (e.g., fire hydrants or other no parking areas), and/or the like. In some embodiments, the apparatus 10 may include means, such as the processing circuitry 12, e.g., the processor 14, for approving at least a portion of a grouping that meets a minimum confidence level. In some embodiments, the minimum confidence level may be determined based on a balancing of the level of precision with having a sufficient number of points to be statistically relevant. For example, the minimum confidence level may be 50%. In some embodiments, the apparatus 10 may include means, such as the processing circuitry 12, e.g., the processor 14, for determining individual on-street parking spaces. In some embodiments, the determination of individual on-street parking spaces may be based on a uniform space length and the overall length of a grouping. For example, the length of an on-street parking space may be known based on location or otherwise.

Referring now to Block 260 of FIG. 2, the apparatus 10 includes means, such as the processing circuitry 12, the processor 14, or the like, for verifying the accuracy of the one or more candidate parking spaces, such as by using imaging technology. In some embodiments, the imaging technology may include using reference images. For example, the reference images may have aerial and/or street level views of a section of a roadway that depict, among other features, parking spaces.

In an example embodiment, the verification process of the apparatus 10, such as the processing circuitry 12, may use street level reference images and/or aerial reference images. For example, one or more vehicles may provide street level images in addition to probe data. In some embodiments, the reference images (street level, aerial, or otherwise) may come from a third party database with images tagged with location information (e.g., database of images from trusted vendors). In some embodiments, the reference images (street level, aerial, or otherwise) may be retrieved from a reference database, such as the map database 28.

FIG. 5 illustrates an example reference street level image that may be used for verification of an on-street parking space. As seen in FIG. 5, the image may include one or more vehicles 500 parked along the street and may in some cases show a sign 510 designating on-street parking areas and/or indicating the parking regulation for a given stretch of on-street parking. In some embodiments, such information from a sign may allow additional information to be known about the parking spaces. For example, a sign, such as the sign 510 shown in FIG. 5, may indicate the beginning point of parking spaces, the end point of parking spaces, hours vehicles are allowed to park in the spaces (e.g., no parking from 9 AM to 5 PM), the type of vehicles allowed to park in the spaces (e.g., Emergency vehicles only), the time limit for a vehicle to be parked in a space (e.g., two hour limit), and/or the like. In some embodiments, the apparatus 10 may be configured to verify on-street parking spaces using a plurality of aerial and/or street level images. In some cases, such as cities, there may be multiple reference images available for the same section of roadway and in such cases, one or more of said reference images may be used to verify the on-street parking. The apparatus 10 may include means, such as the processing circuitry 12, e.g., processor 14, for determining that on-street parking is present in a given street level reference image. Additionally, the apparatus 10 may include means, such as the processing circuitry 12, e.g., processor 14, for comparing the on-street parking shown in a street level reference image and the on-street parking spaces determined in Block 250. In some embodiments, both aerial reference images and street level reference images may be used in verifying on-street parking spaces.

FIG. 6 illustrates an example reference aerial image that may be used for verification of an on-street parking space. As seen in FIG. 6, the aerial reference image may be provide a view of streets and on-street parking. In some embodiments, the aerial images may be captured by a satellite, while other aerial images may be captured by an air vehicle, such as a drone. Aerial images may be effective in areas with little to no tree or structures obstructing the view of the roadway. As shown by callout 600, the apparatus 10 may include means, such as the processing circuitry 12, e.g., the processor 14, for determining that on-street parking is present in a given aerial reference image. Additionally, the apparatus 10 may include means, such as the processing circuitry, e.g., the processor 14, for comparing the on-street parking shown in an aerial reference image and the on-street parking spaces determined in Block 250.

In various embodiments, the apparatus 10 includes means, such as the processing circuitry 12, the processor 14, or the like, for operating additional verification measures for the on-street parking spaces. In some embodiments, the apparatus 10 may receive crowd-sourced verification from one or more users indicating that one-street parking is valid.

Various methods, apparatus, and computer program products are provided in accordance with an example embodiment of the present disclosure for determining on-street parking spaces. In an example embodiment, the apparatus 10 includes means, such as the communication interface 20, processing circuitry 12, processor 14, or the like, for receiving a plurality of individual probe points along a section of a roadway. Each individual probe point may be associated with a location where each probe point was captured by one of one or more vehicles on the section of the roadway. In such an example embodiment, the apparatus 10 includes means, such as the processing circuitry 12, e.g., processor 14, for selecting one or more of the plurality of individual probe points based on a speed of the one or more vehicles associated with each probe point at a time the probe point was captured. In some embodiments, the apparatus 10 may include means, such as the processing circuitry 12, e.g., processor 14, for comparing the location of the selected probe points with a known roadway representation. Based on the comparison, the apparatus 10 may include means, such as the processing circuitry 12, e.g., processor 14, for determining one or more groupings of a plurality of potential parking spaces along the section of the roadway. Based on the determination of the one or more groupings, the apparatus 10 may include means, such as the processing circuitry 12, e.g., processor 14, for identifying a beginning and an end of each of the one or more groupings. The apparatus 10 includes means, such as the processing circuitry 12, e.g., processor 14, for determining one or more candidate parking spaces along the section of the roadway based on a comparison of the beginning and end of each said grouping with previously known parking information. Corresponding methods and computer program products are provided.

FIG. 2 illustrates a flowchart of an apparatus, method and computer program product according to example embodiments of the invention. It will be understood that each block of the flowchart, and combinations of blocks in the flowchart, may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory device 16 of an apparatus 10 employing an embodiment of the present invention and executed by a processing circuitry 12 of the apparatus. As will be appreciated, any such computer program instructions may be loaded onto a computer or other programmable apparatus (for example, hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowchart support combinations of means for performing the specified functions and combinations of operations for performing the specified functions for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included, some of which have been described above. Modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A method for determining a location of on-street parking, the method comprising:
   receiving a plurality of individual probe points along a section of a roadway, wherein each individual probe point is associated with a location where each probe point was captured by one of one or more vehicles on the section of the roadway;
   performing a selection process, the selection process comprising selecting one or more of the plurality of individual probe points based on a speed of the one or more vehicles associated with each probe point at a time the probe point was captured and removing one or more probe points from the selected probe points based on a heading of the one or more vehicles associated with each probe point at a time the probe point was captured;
   comparing the location of the selected probe points with a known roadway representation; and
   based on the comparison, determining one or more groupings of a plurality of potential parking spaces along a direction of the roadway.

2. The method according to claim 1 further comprising:
   based on the determination of the one or more groupings, identifying a beginning and an end of each of the one or more groupings; and
   determining one or more candidate parking spaces along the section of the roadway based on a comparison of the beginning and end of each said grouping with previously known parking information.

3. The method according to claim 2 further comprising:
   verifying the accuracy of the one or more candidate parking spaces using imaging technology.

4. The method according to claim 3, wherein the imaging technology used to verify the accuracy of the one or more candidate parking spaces is based upon at least one of street level images or aerial images.

5. The method according to claim 1, wherein the speed of the one or more vehicles associated with each selected probe at the time that each selected probe point was captured is between zero to a predefined maximum speed.

6. The method according to claim 1, wherein the one or more removed probe points define a heading that varies from the direction of the roadway by more than a predefined amount.

7. The method according to claim 1 further comprising:
   removing probe points from the selected probe points based on the side of the roadway the probe point was captured.

8. The method according to claim 1, wherein the one or more groupings are determined by a shape algorithm, wherein the shape algorithm selects probe points that form an elongated elliptical shape.

9. An apparatus for determining a location of on-street parking, the apparatus comprising at least one processor and at least one non-transitory memory including computer program code instructions, the computer program code instructions configured to, when executed, cause the apparatus to:
   receive a plurality of individual probe points along a section of a roadway, wherein each individual probe point is associated with a location where each probe point was captured by one of one or more vehicles on the section of the roadway;
   perform a selection process, the selection process comprises selecting one or more of the plurality of individual probe points based on a speed of the one or more vehicles associated with each probe point at a time the probe point was captured and removing one or more probe points from the selected probe points based on a heading of the one or more vehicles associated with each probe point at a time the probe point was captured;
   compare the location of the selected probe points with a known roadway representation; and
   based on the comparison, determine one or more groupings of a plurality of potential parking spaces along a direction of the roadway.

10. The apparatus according to claim 9, wherein the computer program code instructions is further configured to, when executed, cause the apparatus to:
    based on the determination of the one or more groupings, identify a beginning and an end of each of the one or more groupings; and
    determine one or more candidate parking spaces along the section of the roadway based on a comparison of the beginning and end of each said grouping with previously known parking information.

11. The apparatus according to claim 10, wherein the computer program code instructions are further configured to, when executed, cause the apparatus to:

verify the accuracy of the one or more candidate parking spaces using imaging technology.

12. The apparatus according to claim 11, wherein the imaging technology used to verify the accuracy of the one or more candidate parking spaces is at least one of street level images or aerial images.

13. The apparatus according to claim 9, wherein the speed of the one or more vehicles associated with each selected probe at the time that each selected probe point was captured is from zero to 20 kilometers per hour.

14. The apparatus according to claim 9, wherein the one or more removed probe points define a heading that varies from the direction of the roadway by more than a predefined amount.

15. The apparatus according to claim 9, wherein the computer program code instructions are further configured to, when executed, cause the apparatus to:
remove probe points from the selected probe points based on the side of the roadway the probe point was captured.

16. The apparatus according to claim 9, wherein the one or more groupings are determined by a shape algorithm, wherein the shape algorithm selects probe points that form an elongated elliptical shape.

17. A computer program product comprising at least one non-transitory computer-readable storage medium having computer-executable program code portions stored therein, the computer-executable program code portions comprising program code instructions configured to:
receive a plurality of individual probe points along a section of a roadway, wherein each individual probe point is associated with a location where each probe point was captured by one of one or more vehicles on the section of the roadway;
perform a selection process, the selection process comprises selecting one or more of the plurality of individual probe points based on a speed of the one or more vehicles associated with each probe point at a time the probe point was captured and removing one or more probe points from the selected probe points based on a heading of the one or more vehicles associated with each probe point at a time the probe point was captured;
compare the location of the selected probe points with a known roadway representation; and
based on the comparison, determine one or more groupings of a plurality of potential parking spaces along a direction of the roadway.

18. The computer program product according to claim 17 wherein the computer-executable program code portions further comprise program code instructions configured to:
based on the determination of the one or more groupings, identify a beginning and an end of each of the one or more groupings; and
determine one or more candidate parking spaces along the section of the roadway based on a comparison of the beginning and end of each said grouping with previously known parking information.

19. The computer program product according to claim 18 wherein the computer-executable program code portions further comprise program code instructions configured to:
verify the accuracy of the one or more candidate parking spaces using at least one of street level images or aerial images.

20. The computer program product according to claim 17, wherein the speed of the one or more vehicles associated with each selected probe at the time that each selected probe point was captured is from zero to 20 kilometers per hour.

21. The computer program product according to claim 17, wherein the one or more removed probe points define a heading that varies from the direction of the roadway by more than a predefined amount.

22. The computer program product according to claim 17, wherein the computer-executable program code portions further comprise program code instructions configured to:
remove probe points from the selected probe points based on a side of the roadway the probe point was captured, wherein the one or more removed probe points define a heading that varies from the direction of the roadway by more than a predefined amount.

23. The computer program product according to claim 17, wherein the one or more groupings are determined by a shape algorithm, wherein the shape algorithm selects probe points that form an elongated elliptical shape.

* * * * *